United States Patent

[11] 3,618,059

[72] Inventor Milton F. Allen
551 E. College Ave., Decatur, Ga. 30031
[21] Appl. No. 738,266
[22] Filed June 19, 1968
[45] Patented Nov. 2, 1971

[54] ELECTRONIC DETECTION AND TRACING MEANS
7 Claims, 8 Drawing Figs.
[52] U.S. Cl. .................................................. 340/224,
325/51, 325/111, 340/280
[51] Int. Cl. ..................................................... G08b 5/22
[50] Field of Search .......................................... 340/224,
280, 258; 325/55, 57

[56] References Cited
UNITED STATES PATENTS

| | | | |
|---|---|---|---|
| 3,157,871 | 11/1964 | Umanoff .................... | 340/280 |
| 3,247,502 | 4/1966 | Eberts ........................ | 340/280 |
| 3,391,623 | 7/1968 | Tabankin ................... | 95/11 |
| 3,440,635 | 4/1969 | Hull ............................ | 340/277 |
| 3,053,416 | 9/1962 | Harner ...................... | 116/67 X |
| 3,564,525 | 2/1971 | Robeson et al. ........... | 340/224 |
| 2,041,577 | 5/1936 | Sutherland ................. | 340/280 UX |
| 3,493,955 | 2/1970 | Minasy ...................... | 340/258 |

Primary Examiner—John W. Caldwell
Assistant Examiner—David L. Trafton
Attorney—William H. Finckel, Jr.

ABSTRACT: Electronic detection and tracing means including a tracing system embodying a miniature radio warning transmitter capable of being attached to a carrier such, primarily, as a package of money or other valuables within which it may be concealed, and the theft of which from a storage location may be anticipated, together with one or more radio-monitoring receives arranged remote from the package to detect unauthorized removal of the package, the escape route taken by the thief, and the location of the package and of the thief, the warning transmitter being controlled by means of a magnet concealed adjacent to the storage location to (automatically) broadcast from the package a continuous warning and detection signal when the package is removed from such location.

Upon receiving such signal, monitor receivers, located at the scene of the theft or stationed along likely escape routes, provide an audible alarm, and may operate warning lights, cameras, coded alarms or the like. Such audible and visual alarms may continue until manually shut off so as to give continuous notice that the package has been removed or, in the case of more remotely located receivers, that the package had passed or come into range, even though no present signal was being received from the transmitter.

INVENTOR.
Milton F. Allen

ELECTRONIC DETECTION AND TRACING MEANS

BACKGROUND OF THE INVENTION

1. Field of the Invention

The invention relates to means automatically responsive to condition, such as placement or removal, and embodies means which will enable authorized persons to trace and locate a removed carrier, such as a package or the like, as above indicated.

2. Description of the Prior Art

The prior art now known is best represented by the U.S. Pat. Nos. of:

Rugh, 2,135,476, Nov. 1, 1938; Davidson 2,141,293, Dec. 1, 1938; Larson, 2,758,296, Aug. 7, 1956; Sawicki, 2,912,540, Nov. 10, 1959; Segel, 3,140,289, Sept. 17, 1963; Eberts, 3,247,502, Apr. 19, 1966; Trupiano et al., 3,253,271, May 24, 1966; Denney et al., 3,290,597 Dec. 6, 1966.

Although all of these patents disclose alarm devices of various types, none of them can be said to disclose the full equivalent of applicant's invention in that none of them embodies all of applicant's operative elements and their combined operative functions such as the transmitter concealed within the package and the means for activating such transmitter; nor does any of them disclose means directed to the determination of the flight pattern and location of both the package and the thief.

SUMMARY OF THE INVENTION

This invention provides, primarily, a system for tracing and detecting the location of a package of money or other material of value which has been removed from a normal storage location. A miniature radio warning transmitter concealed within the package is silently actuated upon any unauthorized removal of the package to broadcast a warning alarm to one or more remote monitor radio receivers to aid in the tracing, detecting and locating of such package. The system may, however, serve in the tracing and locating of carriers of various types.

Primary object of the invention is to provide a theft tracing and warning system which is automatically actuated upon the removal of a protected item from a normal storage location to transmit an alarm signal to one or more remote locations. The transmission of such alarm signal is to be accomplished from the protected item itself, ad without any inherent audible signal which could alert a thief to the fact that he has in his possession an article by which a warning signal has been actuated.

Another object of the invention is to provide a warning and detection system for a protected item which will enable the custodian thereof to continually monitor its position upon its removal from a storage location, whether such removal be by an unauthorized person or merely due to an inadvertent loss such as misplacement of consigned goods.

A further object of the invention is to aid others than the custodian of the protected item, such as law enforcement officers, in the tracing, detection and apprehension of persons in unauthorized possession of the protected item.

Still another object of the invention is to provide multiple stationary or mobile receivers strategically located along likely escape routes and in traffic terminals to detect passage of stolen package and the thief when the transmitter concealed in the package, emitting its continuous signal, comes within range of such receivers, thus actuating audible and visual alarms which may emit continuous signals until manually shut off, thus making possible the determination of a flight pattern and the location of both the package and the thief.

Other objects and advantages of the invention will become apparent as set forth in the following description.

BRIEF DESCRIPTION OF THE DRAWINGS

In the accompanying drawings, in the several figures of which like parts are similarly designated.

Description of the Preferred Embodiment

Figure 1:
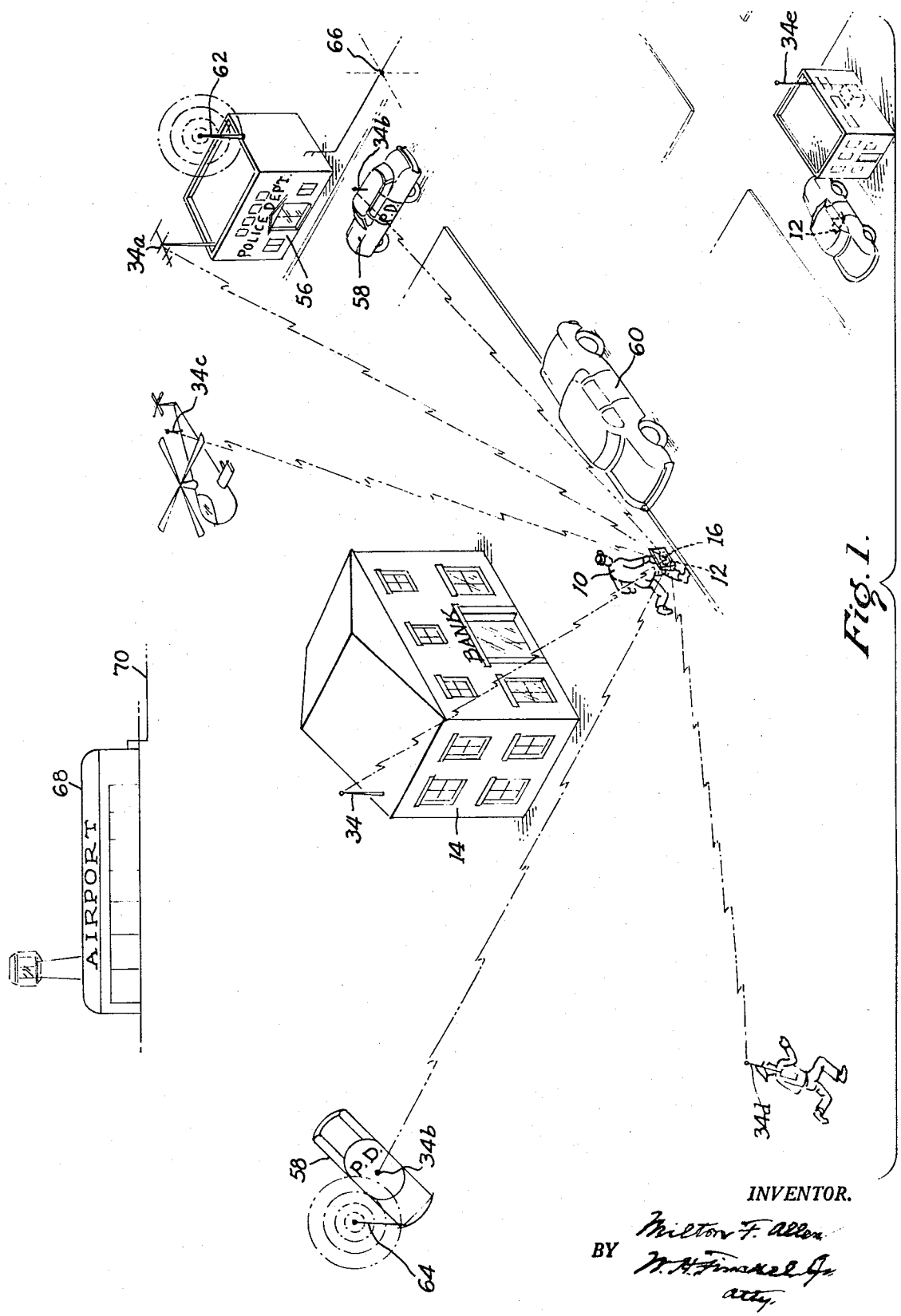
FIG. 1 is a schematic perspective view illustrating the overall application and utility of a theft warning and tracing system in accordance with the invention.
Figure 3:
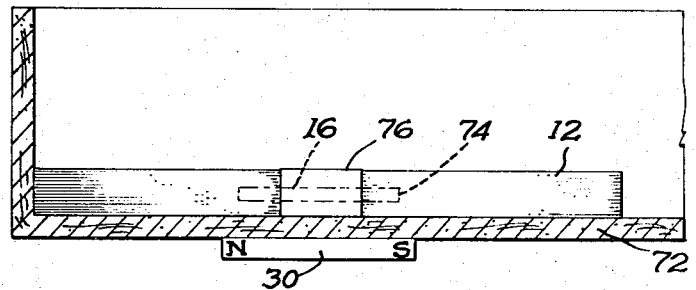
FIG. 3 is a fragmentary sectional elevational view of a cash drawer with protection by the warning transmitter of the invention.
Figure 4:
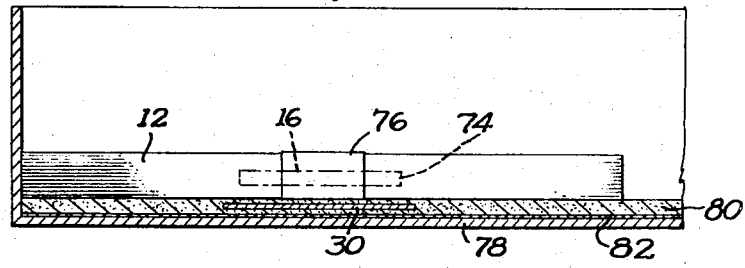
FIG. 4 is a view similar to FIG. 3, but illustrating an alternative embodiment for use with a different type of cash drawer.
Figure 5:
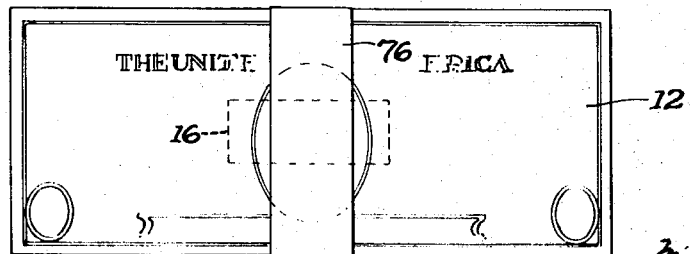
FIG. 5 is a plan view of a package of paper money illustrating the embodiment therein of the theft-tracing concept of the invention.

In the schematic view of FIG. 1 there is shown a thief 10 wh has in his possession a protected item 12 which he has stolen from the premises of the bank 14. Concealed within the protected item, which may be a package of currency, such as that shown in FIGS. 3, 4 and 5, is the warning transmitter 16 of the invention.

When the protected item is removed from its normal storage location, such, for example, as a teller's cash drawer as will be described hereinafter, the warning transmitter is actuated according to the arrangement illustrated in FIG. 2.

Figure 2:
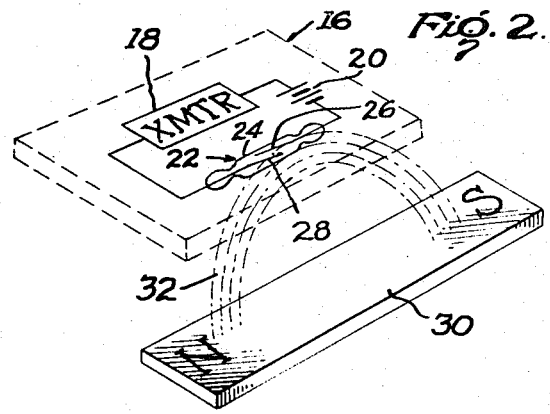
FIG. 2 is a schematic representation of a warning transmitter for concealment within a protected item, together with actuating means therefor.

FIG. 2 shows that the transmitter 16 includes a basic element 18 which comprises a radiofrequency oscillator, a modulator and a radiating antenna, as described in greater detail hereinafter, an energizing battery 20, and an actuating switch 22. The switch 22 consists of a hermetically sealed glass envelope 4 within which are located a fixed contact 26 and a movable contact, or armature reed element 28. A permanent magnet 30 is secured in a fixed position adjacent to the warning transmitter 16.

So long as the transmitter 16 remains in normal position adjacent to the magnet 30 the magnetic field indicated by broken lines 32 acts upon the movable switch contact 28 to hold such contact in an open position with respect to the fixed contact 26. However, upon removal of the transmitter from the field of the magnet 30 the contact arm 28 moves to a closed position against the fixed contact 26 due to an internal spring-biasing force inherent in the manner in which the armature reed arm is sealed within the glass envelope 24. Magnetic reed switch means suitable for the switch element 22 are commercially known and available.

Upon closure of the switch contacts 26 and 28 a circuit is completed which connects the battery 20 to the transmitter element 18 to energize the same to transmit a continuous warning radio signal.

Such warning signal will be received by one or more monitoring receivers at locations remote from the protected item, as indicated by the several receivers 34, 34a, 34b, 34c, 34d and 34e, shown in FIG. 1, for example.

Obviously, a primary location for a monitor receiver of the system would be on the protected premises, such as the bank building 14 of FIG. 1.

Figure 6:
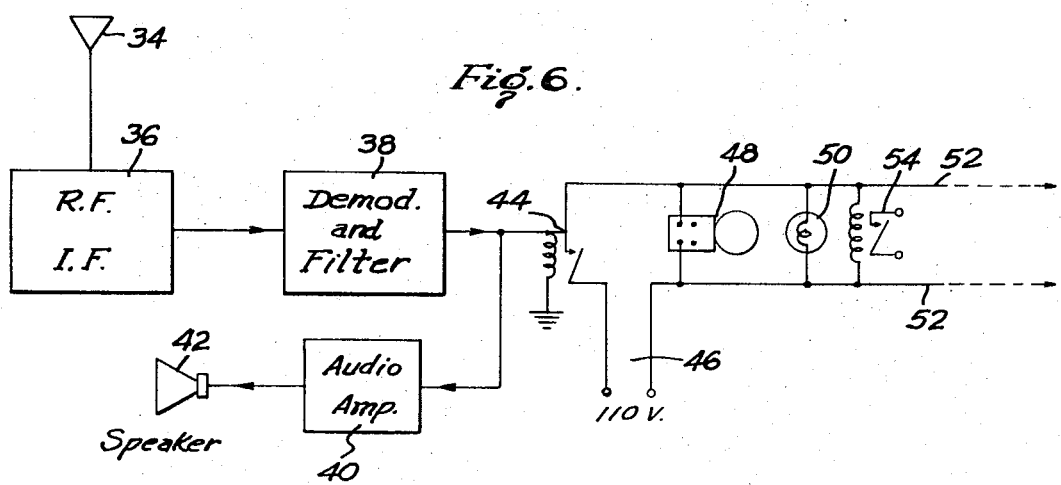
FIG. 6 is a diagram in block form, and schematically, of a monitor receiver for the system of the invention.

The monitor receiver is illustrated in FIG. 6. The receiving antenna 34 feeds the warning radio signal from the transmitter 16 through conventional circuitry such as RF and IF stages 36, and a demodulator stage 38 which includes a selective filter tuned to the modulation characteristics of the warning transmitter. In the example shown in FIG. 6 such characteristic modulation may be a continuous or uninterrupted audio tone signal which is amplified in stage 40 to actuate an audible warning signal which is indicated as a loud speaker device 42.

The monitor receiver of FIG. 6 further includes relay means 44 actuated by the output of the demodulator stage 38.

Upon receipt of a warning radio signal from the transmitter actuated within the protected item, relay 44 closes its normally open contacts to connect a voltage source 46 which energizes an audible alarm bell 48, a visual alarm such as a lamp 50, or other suitable known warning indicators which may be connected in parallel therewith, as indicated by the leads 52. For example, an auxiliary alarm relay 54 may be energized to actuate a further alarm system such as a leased wire to a commercial security organization, or to police headquarters.

An important feature of the present invention lies in the fact that the warning radio signal transmitted from the protected article may be simultaneously received at more than one monitoring receiver. As indicated in FIG. 1, a receiving antenna 34a mounted at a central station or police headquarters building 56 may also receive the warning or theft-tracing signal which indicates that the protected item has been removed from its storage location. By utilizing a directional receiving antenna 34a it is possible to obtain an indication of the location of the thief 10 after he has left the premises of the bank 14.

Individual police or commercial security patrol cars 58 will also receive the theft-warning signal by means of their antennas 34b. By utilizing direction reception properties of the radiated warning signal it will be possible for one patrol car to cooperate with another such car or with the central station monitor receiver, or a combination of all three, to obtain a two-way or three-way directional "fix" so as to pinpoint the location of the escaping thief 10. This feature of the invention, multiple simultaneous reception by two or more monitor receivers, is a distinct advantage in the apprehension of an escaping criminal, particularly should he utilize an escape vehicle 60 wherein the thief and his loot would not ordinarily be visible to enforcement officers.

Other suitable and advantageous monitoring receiver locations are indicated in FIG. 1, such as a patrol aircraft equipped with an antenna 34c or a foot patrolman having a monitor alarm receiver equipped with an antenna 34d of the loop directional type, or other antenna of directional type including a visual right or left indicator, or indicators, such as milliampere (needle) equipment which can also be used in conjunction with the monitoring receivers in police cars to determine right or left direction of the concealed transmitter and hence of the package and the thief.

A very important tracing feature of the invention lies in the use of multiple stationary or mobile receivers initially out of range of the transmitter signal at the time of the theft but which are strategically located along likely escape routes, as in police cruisers alerted to cover expressway routes from a city, or in the windows of stores and the like fronting on main highways, such as 34e, FIG. 1, enabling merchants to detect the passage of a stolen package, and of a thief, by the actuation of remotely stationed receivers by the concealed transmitter's continuous signal which would also actuate the continuous audible and visual alarms provided by such receivers, as well as relay facilities.

This feature will make possible a means to identify and detect a so-called second car to which a felon might have transferred and which has often been successfully used in escapes, as it will, for example, enable an alerted merchant to look out of his store window and obtain the license number, ad a description, of the escape car, and identifying characteristics of the occupant or occupants of the car. Moreover, should the car have to stop for a traffic light at an intersection adjacent to the merchant's location sufficient time would in all likelihood be given the merchant to telephone police headquarters that his "robber alert" had "gone off." Similar calls from other merchants, or from police cruisers, equipped with the monitoring receivers, to a central station would permit a quick relay of the pertinent information to all police cars and other law enforcement agencies, by police radio, to thus aid in determining the escape route taken by the thief and the probable, or final, location of both the thief and the stolen package.

The audible and visual alarms provided by the receiver being continuous in operation once the receiver has been activated until manually shut off, has the advantage that continuous notice is given that the package carrying the transmitter had been removed from its storage location, or, in the case of relatively distantly located receivers, that the package had passed, or come into range, even though no present signal was being received from the transmitter.

The alarm transmitter 16 is preferably constructed in accordance with solid-state miniturizing techniques, such as integrated circuits and encapsulated designs so that it is very small, and preferably wafer-thin, for concealment within a protected item such as the package of money (banknotes) illustrated in FIGS. 3, 4 and 5. However, the small size of the transmitter and its associated battery power source and radiating antenna will necessarily limit the transmission range of the theft waning signal. By employing ultrahigh radio frequencies for transmission, a reasonable transmission range for the radio signal may readily be achieved. Nevertheless, the range of the warning signal may be extended by employing rebroadcast techniques utilizing the longer range high-power transmitters normally operated by law enforcement officers, as indicated by the antenna 62 located at the central station 56, or the antenna 64 shown on one of the patrol cars 58 in FIG. 1.

A further means of apprehending an escaping thief may be utilized with the system of the invention. The central station 56, or a commercial security organization, may be equipped with a wired warning alarm system as indicated generally by the network 66 shown in FIG. 1. A wired alarm system of this type can be utilized to alert transportation terminals through which the thief might pass in his attempt to escape, such as that indicated by the terminal 68 having an alarm signal wire 70 for connection (not shown) to the wired network 66.

In connection with the above, or as an optional alert at terminals, receivers at these locations may be independently actuated as the continuous signal of the concealed transmitter comes into range of the fixed or mobile-monitoring receivers stationed at strategic positions at the escape facilities, such as the said terminals, or along usual paths of escape.

FIGS. 3 and 4 illustrate preferred embodiments of the invention wherein the alarm transmitter arrangement shown schematically in FIG. 2 is concealed within a banded package of currency 12 which is located at the bottom, preferably, or a teller's cash drawer 72, as in the bank building 14.

In FIG. 3, the cash drawer 72, shown in sectional elevation, is constructed of nonferrous material, and the magnet 30 may be secured in any available manner in a hidden position beneath the drawer surface. The transmitter 16 is concealed within the package of currency 12 in a false hollowed-out portion represented at 74, and the whole assembly is secured in the usual known manner by means of a band 76 which may be imprinted, as usual, with the number and denomination of the banknotes.

In FIG. 4, the cash drawer 78 is shown as constructed of a ferrous material, and therefore would act to shield the switch 22 from actuation by the magnet 30 if it were located as shown in FIG. 3. Accordingly, the magnet 30 is here shown as hidden within a member 80 which forms an inner lining of the cash drawer and is permanently attached therein, as by a pressure-sensitive layer 82.

The package of money 12 as shown in plan in FIG. 5, is secured by the band 76 in the conventional manner, and the warning transmitter 16 is concealed therein. The two outer banknotes of the package may, if desired, be treated so as to embody the detection principles disclosed in applicant's U.S. Pat. for Detection Treatment of Paper Money and other Negotiable Paper, U.S. Pat. No. 3,272,533, granted Sept. 13, 1966.

Figure 7:
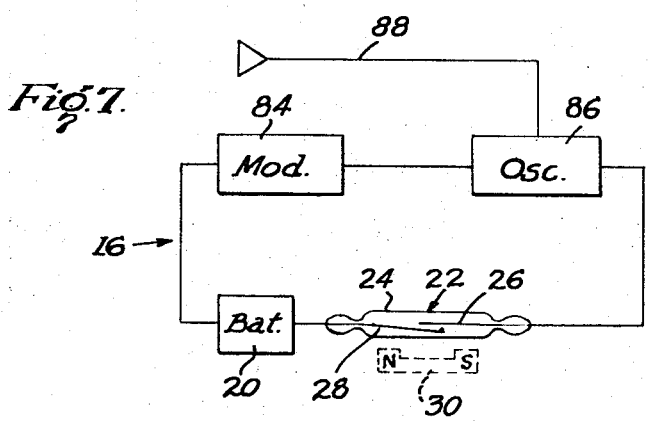
FIG. 7 is a complete schematic representation of a warning transmitter for the system of the invention.

As hereinbefore noted, and as shown in complete schematic form in FIG. 7, the concealed warning radio transmitter 16 includes a modulator stage 84 which serves to identify the particular protected item, an RF oscillator stage 86 driven thereby, and a suitable antenna 88. By utilizing ultrahigh radio frequencies and known miniaturization techniques, the antenna may be of reduced dimensions for concealment purposes within the protected item, while affording a limited but adequate transmission range to the monitor receiver. The modulator stage 84 provides an identifying characteristic which, in the preferred embodiment, is an audio tone suitable for detection and actuation of the audible alarm 48 and visual alarm 50 of the receiver shown in FIG. 6.

Figure 8:
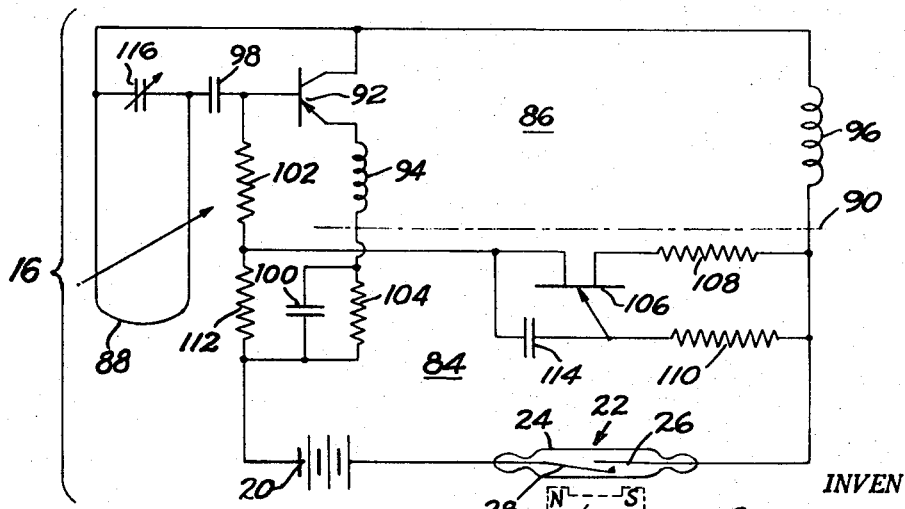
FIG. 8 is a detailed wiring diagram of a preferred embodiment of the transmitter represented in FIG. 7.

One form of miniature transmitter circuit which has proved to be successful in an experimental model of the invention is shown in FIG. 8. This figure should be compared with FIG. 7. The broken line 90 indicates the division between the components of the oscillator stage 86 and the modulator stage 84. In the experimental model the following values of the circuit components were obtained.

| | |
|---|---|
| Oscillator Stage 86 | |
| Transistor 92 | Motorola MPS 6508 |
| Oscillator Coils 94, 96 | 3.9 muh |
| Condenser 98 | 50 pf. |
| Condenser 100 | 0.005 mfd.–10 volt |
| Resistor 102 | 1200 ohms |
| Resistor 104 | 300 ohms |
| Modulator State 84 | |
| Unijunction Transistor 106 | G.E. 2N 2646 |
| Resistor 108 | 47 ohms |
| Resistor 110 | 4700 ohms |
| Resistor 112 | 2400 ohms |
| Condenser 114 | 0.05 mfd.–10 volt |
| Antenna Condenser 116 | 5 pf. |
| Battery 20 | 9 volts |
| Switch 22 | Gordoa MR 203 |
| Carrier Frequency | 265 mHz. |
| Modulator Frequency | 3000 cycles |
| Power Input | 45 mw. |

Various changes and modifications are considered to be within the principle of the invention and the scope of the following claims.

I claim:

1. An electronic detection and tracing system for detecting and tracing the unauthorized removal of an article from a fixed location comprising in combination a radio transmitter housed within a substantially flat package for concealment within the article, said transmitter being tuned to provide an output signal of a fixed output frequency, storage means for said article defining the fixed location and providing access to said article, said transmitter being concealed within said article and fixed thereto such that said article becomes a carrier for said transmitter upon removal of the article from the storage means, a source of operating power for said transmitter, switch means adapted to be actuated between a normally closed position and a normally open position, said source of power and said switch means being disposed within said flat package, means connecting said switch means to said transmitter such that said transmitter is operatively connected to said power source when said switch means is closed, magnetic control means disposed at said fixed location adjacent to and external of said article such that the magnetic field of the control means is effective to maintain said switch open while said article is at the storage location and ineffective to maintain said switch open upon removal of the article outside the effective magnetic field of said control means, a plurality of remotely disposed monitor receivers each tuned to the output frequency of said transmitter, each said receiver having direction-finding characteristics for obtaining a directional fix on the output of said transmitter being operative upon reception of the transmitted signal to trace movement of said article away from said storage means and alarm means connected to said receiver and adapted to be energized upon operation thereof to provide an indication of the removal of said article from the fixed location.

2. In electronic detection and tracing means as defined in claim 1, said article being a package of banknotes, said storage location being a money drawer, and said control means being a permanent flat magnet positioned adjacent to said drawer and package.

3. In electronic detection and tracing means as defined in claim 1, said receiver-actuated alarm including a relay device to transmit a warning signal to one or more further remote locations.

4. In electronic detection and tracing means as defined in claim 1, wherein at least one of said remote monitor receivers is disposed on a mobile apparatus.

5. In electronic detection and tracing means as defined in claim 4, wherein another of said remote monitor receivers is disposed at a central control location, said receivers having direction finding characteristics for obtaining a fix on the location of the moved article.

6. In electronic detection and tracing means as defined in claim 5, wherein other of said monitor receivers are disposed in locations remote from the location from which the article has been removed said locations being out of reception range of the transmitted signal and adapted to receive the signal from the transmitter carried by the article when moved to a location the article is within the reception range of said other of said monitor receivers, whereby the route taken by the transporter of the article may be determined and law-enforcement officers alerted as to the identity of the transporter and his means of transportation.

7. In electronic detection and tracing means as defined in claim 1, said receiver means when initially activated serving to continuously energize said alarm means and further including manually operable switch means connected to said alarm whereby energization of said alarm may be manually interrupted.

* * * * *

UNITED STATES PATENT OFFICE
CERTIFICATE OF CORRECTION

Patent No. 3,618,059            Dated November 2, 1971

Inventor(s) Milton F. Allen

It is certified that error appears in the above-identified patent and that said Letters Patent are hereby corrected as shown below:

Column 1, lines 11 and 12, "Pat. Nos." should read -- patents --; line 14, "Larson" should read -- Larsen --; line 15, "3,140,289" should read -- 3,104,289 --; line 41, "Primary" should read -- The primary --; line 46, "ad" should read -- and --. Column 3, line 65, "ad" should read -- and --.

Signed and sealed this 15th day of August 1972.

(SEAL)
Attest:

EDWARD M. FLETCHER, JR.            ROBERT GOTTSCHALK
Attesting Officer                   Commissioner of Patents